(12) United States Patent
Bruno et al.

(10) Patent No.: US 11,190,270 B2
(45) Date of Patent: Nov. 30, 2021

(54) LOCATING A FAULT IN AN OPTICAL COMMUNICATION LINK

(71) Applicant: Telefonaktiebolaget LM Ericsson (publ), Stockholm (SE)

(72) Inventors: Gianmarco Bruno, Genoa (IT); Daniele Ceccarelli, Stockholm (SE); Roberto Magri, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/652,638

(22) PCT Filed: Oct. 5, 2017

(86) PCT No.: PCT/EP2017/075313
§ 371 (c)(1),
(2) Date: Mar. 31, 2020

(87) PCT Pub. No.: WO2019/068325
PCT Pub. Date: Apr. 11, 2019

(65) Prior Publication Data
US 2020/0244354 A1 Jul. 30, 2020

(51) Int. Cl.
*H04B 10/07* (2013.01)
*H04B 10/079* (2013.01)
*H04B 10/071* (2013.01)

(52) U.S. Cl.
CPC ....... *H04B 10/0791* (2013.01); *H04B 10/071* (2013.01)

(58) Field of Classification Search
CPC .............. H04B 10/0791; H04B 10/071; H04B 10/0773; H04B 10/0771
See application file for complete search history.

(56) References Cited

U.S. PATENT DOCUMENTS

| | | | |
|---|---|---|---|
| 7,577,099 B1* | 8/2009 | Greenberg | H04L 41/0677 370/241 |
| 2006/0004916 A1* | 1/2006 | Caviglia | H04L 41/0677 709/223 |
| 2018/0278520 A1* | 9/2018 | Fiaschi | H04L 45/04 |
| 2019/0097917 A1* | 3/2019 | Iizawa | H04L 45/28 |

OTHER PUBLICATIONS

PCT International Search Report, dated Jun. 7, 2018, in connection with International Application No. PCT/EP2017/075313, all pages.

(Continued)

*Primary Examiner* — Dzung D Tran
(74) *Attorney, Agent, or Firm* — Leffler Intellectual Property Law, PLLC

(57) ABSTRACT

Methods and apparatus are provided for locating a fault in an optical communication link. In one aspect, a method comprises determining a fault in a first optical link, and determining a fault in a second optical link. The method then determines that a first portion of the first optical link is co-located with a second portion of the second optical link and identifies, as a result of determining that the first portion is co-located with the second portion, that the fault in the first optical link is located in the first portion and/or the fault in the second optical link is located in the second portion.

22 Claims, 4 Drawing Sheets

(56) References Cited

OTHER PUBLICATIONS

PCT Written Opinion, dated Jun. 7, 2018, in connection with International Application No. PCT/EP2017/075313, all pages.
Daniele Ceccarelli et al., "Framework for Abstraction and Control of Traffic Engineered Networks", draft-ietf-teas-actn-framework-02, TEAS Working Group, Internet Draft, Jun. 2017, 32 pages.
Y. Lee et al., "A Yang Data Model for WSON Optical Networks", draft-ietf-ccamp-wson-yang-05.txt, CCAMP Working Group, Internet Draft, Aug. 21, 2017, 13 pages.
Xufeng Liu et al., "YANG Data Model for TE Topologies", draft-ietf-teas-yang-te-topo-09, TEAS Working Group, Internet Draft, Jun. 12, 2017, pp. 1-117.
Mohammed L. Ali et al., "M-Burst: A Framework of SRLG Failure Localization in All-Optical Networks", J. Opt. Commun. Network, vol. 4, No. 8, Aug. 2012, pp. 628-638.
Satyajeet S. Ahuja et al., "SRLG Failure Localization in Optical Networks", IEEE/ACM Transactions on Networking, vol. 19, No. 4, Aug. 2011, pp. 989-999.
European Communication dated Dec. 21, 2020 in connection with European Application No. 17787129.0, 5 pages.

\* cited by examiner

LOCATING A FAULT IN AN OPTICAL COMMUNICATION LINK

TECHNICAL FIELD

Examples of the present disclosure relate to methods and apparatus for locating a fault in an optical communication link, such as for example a link in an optical communications network.

BACKGROUND

Optical communication networks can be used for communications between network elements. An optical communication link may be present between two network elements, and may comprise a passive link that comprises a single optical fiber or multiple optical fibers spliced together. An optical communication link may also include active devices such as optical switches.

An Optical Time Domain Reflectometer (OTDR) can be used to locate a fault along an optical fiber link between two network elements. An OTDR, located at one of the network elements, sends pulses are sent into the optical fiber to be monitored. The pulses may undergo attenuation, scattering and Fresnel reflections in the fiber due to fiber properties or fiber damage, and reflections may be detected by the OTDR. By measuring the round trip time, localization of the fiber damage may be possible. For example, a fiber break may be detected as a reflection peak at a particular round trip time, the round trip time indicating an approximate distance of the break from the OTDR. The term OTDR may also refer to the technique employed to locate a fault, i.e. Optical Time Domain Reflectometry.

SUMMARY

One aspect of the present disclosure provides a method of locating a fault in an optical communication link. The method comprises determining a fault in a first optical link, and determining a fault in a second optical link. The method also comprises determining that a first portion of the first optical link is co-located with a second portion of the second optical link and identifying, as a result of determining that the first portion is co-located with the second portion, that the fault in the first optical link is located in the first portion and/or the fault in the second optical link is located in the second portion.

Another aspect of the present disclosure provides apparatus for locating a fault in an optical communication link. The apparatus comprising a processor and a memory. The memory containing instructions executable by the processor such that the apparatus is operable to determine a fault in a first optical link, determine a fault in a second optical link, determine that a first portion of the first optical link is co-located with a second portion of the second optical link and identify, as a result of determining that the first portion is co-located with the second portion, that the fault in the first optical link is located in the first portion and/or the fault in the second optical link is located in the second portion.

A further aspect of the present disclosure provides apparatus for locating a fault in an optical communication link. The apparatus is configured to determine a fault in a first optical link, determine a fault in a second optical link, determine that a first portion of the first optical link is co-located with a second portion of the second optical link and identify, as a result of determining that the first portion is co-located with the second portion, that the fault in the first optical link is located in the first portion and/or the fault in the second optical link is located in the second portion.

A still further aspect of the present disclosure provides apparatus for locating a fault in an optical communication link. The apparatus comprises a first determining module configured to determine a fault in a first optical link and a second determining module configured to determine a fault in a second optical link. The apparatus also comprises a third determining module configured to determine that a first portion of the first optical link is co-located with a second portion of the second optical link and an identifying module configured to identify, as a result of determining that the first portion is co-located with the second portion, that the fault in the first optical link is located in the first portion and/or the fault in the second optical link is located in the second portion.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, application specific integrated circuit, ASICs, programmable logic arrays, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
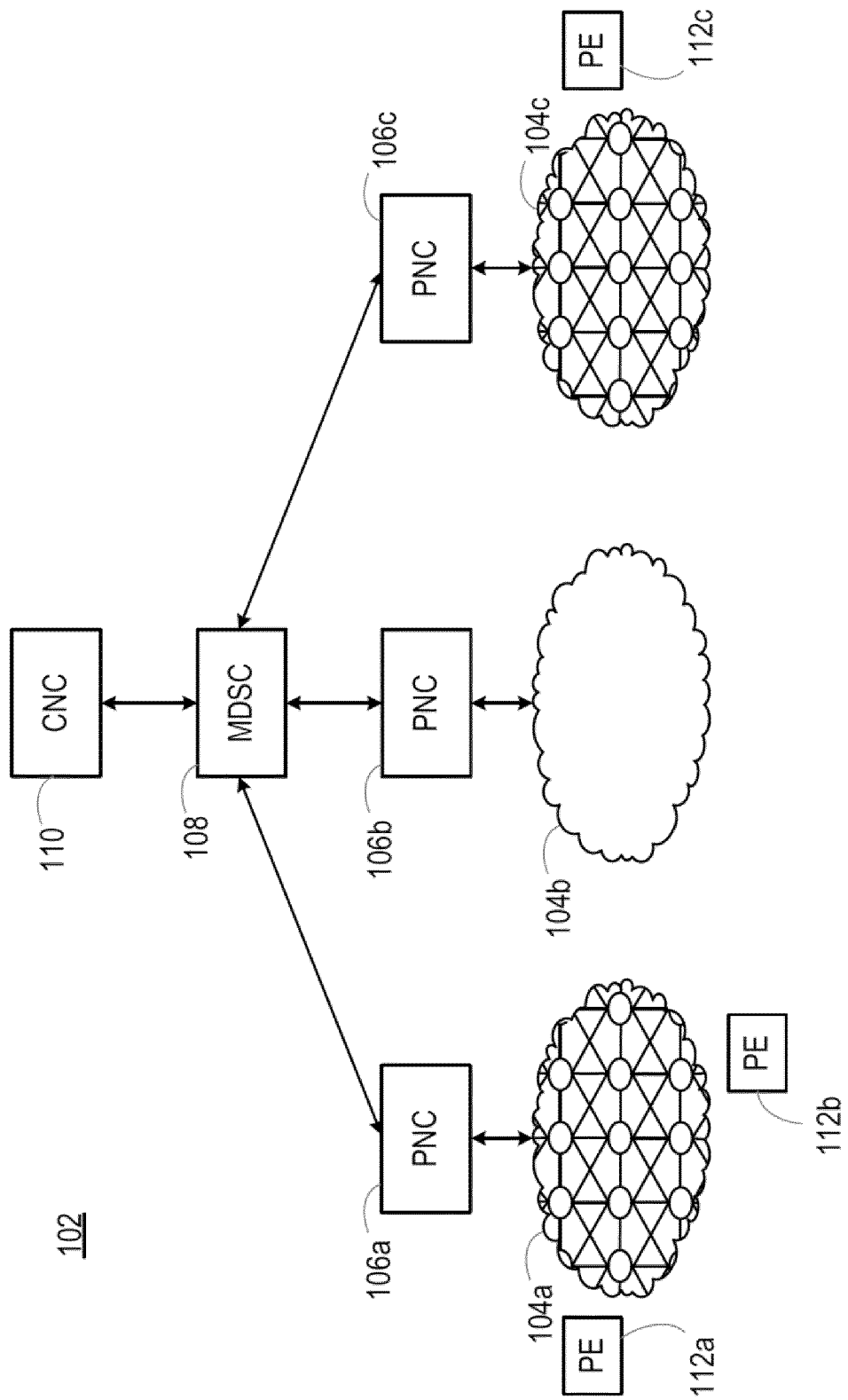
FIG. 1 is a schematic illustration of an example of an optical communications network.

FIG. 1 shows an example of an optical communications network 102. In the illustrated example, the components are arranged according to the Abstraction and Control of Traffic-Engineered Networks (ACTN) networking paradigm, conceived to facilitate virtual network operation and the creation of a virtualized environment in which operators can view and control multi-subnet and multi-technology networks as a single virtualized network. The ACTN framework is defined in Ceccarelli et al, "Framework for Abstraction and Control of Traffic Engineered Networks" (draft-ietf-teas-actn-framework-07), TEAS Working Group, Internet Draft, 20 Jul. 2017.

ACTN terminology is used throughout the description of FIG. 1 and in other parts of the description. Those skilled in the art will appreciate that the concepts methods and apparatus described herein are equally applicable to other networking paradigms, and may be adapted straightforwardly for use in those networking paradigms. Embodiments disclosed herein are not limited to ACTN.

The ACTN architecture presents a 3-tier model of a communications network. It defines three types of controllers depending on the functionalities they implement. These are a Customer Network Controller (CNC), a Multi Domain Service Coordinator (MDSC) and a Physical Network Controller (PNC).

A Virtual Network Service is requested from a MDSC by a Customer Network Controller (CNC), such as for example via a CNC-MDSC Interface (CMI). The MDSC is located between the CNC and one or more PNCs, and requests network resources from one or more PNCs based on the request from the CNC. A PNC is associated with a network domain and controls configuration of the physical network of that domain, and can allocate network resources within that domain, based on requests from the MDSC.

The example network 102 shown in FIG. 1 comprises a plurality of domains 104a, 104b, 104c (collectively, 104), each managed by respective physical network controllers (PNCs) 106a, 106b, 106c (collectively, 106). The PNCs each communicate with a parent controller, which in the illustrated embodiment is termed a multi-domain service coordinator (MDSC) 108, and the MDSC 108 communicates with one or more clients via one or more customer network controllers (CNCs) 110 (although only a single CNC is shown in FIG. 1). First and second network elements or path elements (PEs) 112a, 112b are coupled to domain 104a, while a third network element or PE 112c is coupled to domain 104c.

Each PNC 106 is responsible for the configuration of network elements within its respective domain 104, monitoring the physical topology of the respective domain 104, and communicating that topology to the MDSC 108. The physical topology may be communicated to the MDSC in raw (i.e. unprocessed) or abstracted (i.e. processed) formats. The PNCs 106 communicate with their respective domains 104 via respective southbound interfaces (SBIs), and with the MDSC 108 via respective MDSC-PNC interfaces (MPIs). The MDSC-PNC Interface (MPI) is an interface between a Multi Domain Service Coordinator (MDSC) and a Physical Network Controller (PNC). It communicates the creation request, if required, of new connectivity and bandwidth changes in the physical network, via the PNC. In multi-domain environments, the MDSC may establish multiple MPIs, one for each PNC.

In some embodiments, the messages communicated via the MPIs may be defined and transported according to the Path Computation Element Protocol (PCEP). In other embodiments, the messages may be defined according to YANG (Yet Another Next Generation) and transported via the NETCONF network configuration protocol. In other embodiments, different data modelling systems and/or communication protocols may be employed. YANG is specified in RFC7950, whereas NETCONF is specified in RFC6241.

Each PNC 106 may also comprise a path computation element (PCE) responsible for the computation of paths between network elements or path elements (PEs) in their domain, i.e. intra-domain paths. For example, PNC 106a may be responsible for computing a path between PE 112a and PE 112b.

The MDSC 108 receives topological information from each of the PNCs 106, and thus is able to build a single end-to-end network topology covering the entire network 102. The end-to-end network topology may be abstracted (i.e. processed) so as to provide a consistent overview of the network regardless of different technologies and protocols implemented in each of the domains 104. The MDSC 108 may communicate that harmonized view of the network to one or more CNCs via respective CNC-MDSC interfaces (CMIs). In some embodiments, the messages communicated via the CMIs may be defined and transported according to PCEP. In other embodiments, the messages may be defined according to YANG and transported via the NETCONF network configuration protocol. In other embodiments, different protocols may be employed. The MDSC 108 may also receive requests from the CNCs 110 via the CMIs for the creation of new connections, the modification of existing connections or scheduled connections, or the removal of existing or scheduled connections.

The MDSC 108 thus enables management of the network 102 as a whole, allowing the maintenance of end-to-end services across multiple domains, the definition of virtual networks or slices across multiple domains, and additional services.

Optical communication links can be partially co-located. For example, a portion of a first link can be co-located with a portion of a second link. The portions can be for example located within the same trench or contained within the same bundle of optical fibers. As a result, if an event causes damage to the portion of the first link, the same event may also cause damage to the portion of the second link due to its proximity to the portion of the first link.

Embodiments of the present disclosure may determine a fault in a first optical link and determine a fault in a second optical link. It may also be determined that a first portion of the first optical link is co-located with a second portion of the second optical link. As a result of determining that the first portion is co-located with the second portion, it may be identified that the fault in the first optical link is located in the first portion and/or the fault in the second optical link is located in the second portion. This information could be used to locate the fault, particularly if apparatus associated with one or both optical links are unable to locate the fault and are only able to, for example, detect that the link is inoperative or unreliable.

Figure 2:
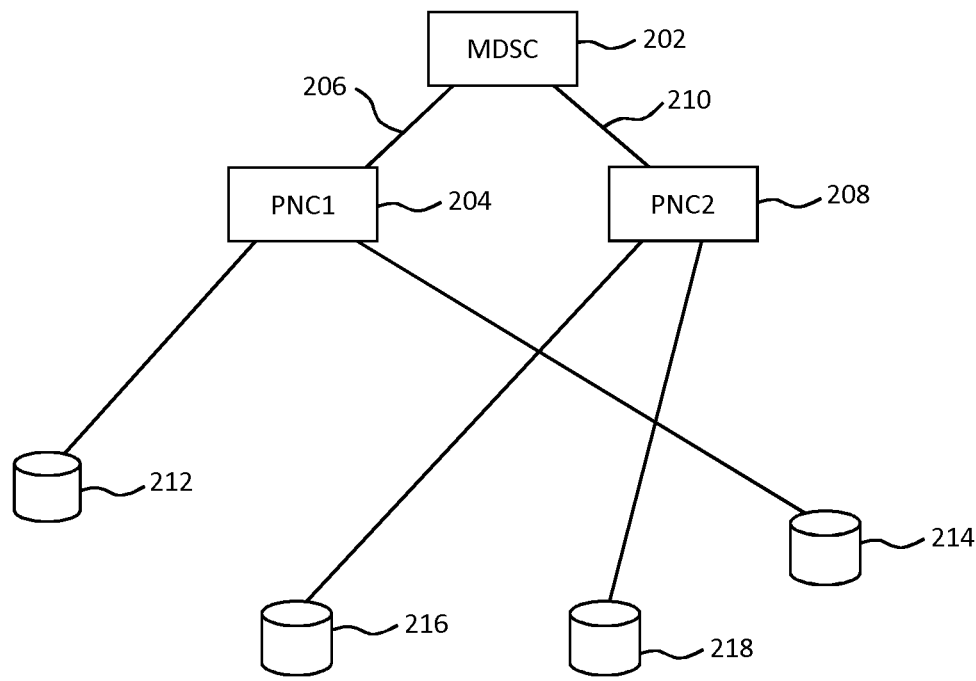
FIG. 2 is a schematic illustration of an example of another optical communications network.

FIG. 2 shows an example of an optical communications network 200. The network 200 includes a MDSC 202 that is in communication with a first PNC 204 via MPI 206, and a second PNC 208 via MPI 210. The first PNC 204 is associated with a first network element 212 and a second network element 214. The first PNC 204 and the first and second network elements 212 and 214 may form a first network domain. Similarly, the second PNC 208 is associated with a third network element 216 and a fourth network element 218, and the second PNC 208, third network element 216 and fourth network element 218 may form a second network domain. The network domains may also include further network elements (not shown).

Figure 3:
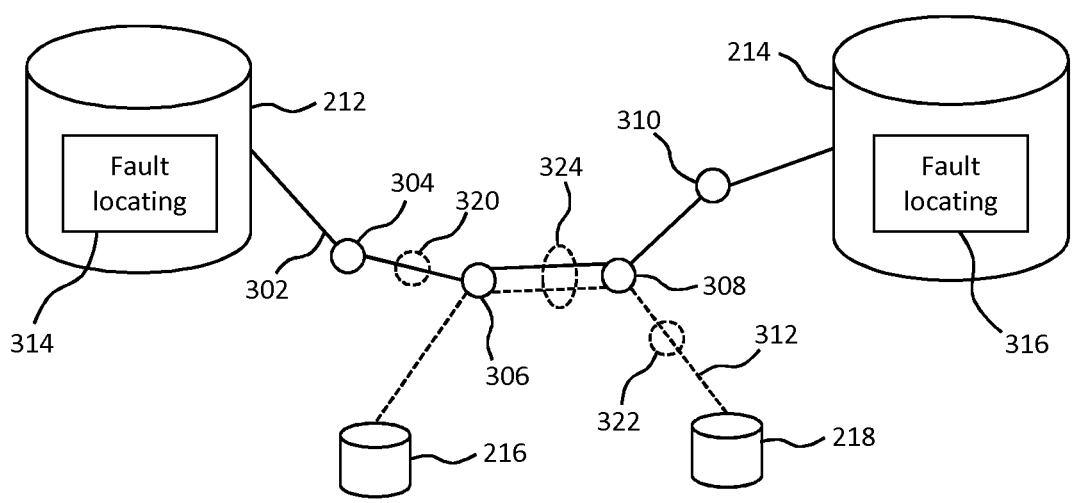
FIG. 3 is a schematic illustration of a portion of an optical communications network.

FIG. 3 shows the network elements 212-218 and optical communication links between them. A first optical communication link 302 between the first network element 212 and the second network element 214 may traverse branching units 304, 306, 308 and 310. Each of the branching units 304-310 may be a point along the first communication link where optical fiber portions are spliced together, and may be passive apparatus such as a fibre optic patch panel or fibre optic enclosure, or active apparatus such as a switch or router. A branching unit may include a device in which an optical cable is unbundled, spliced and/or has its component fibres connected. It may also include a device adapted to join or separate a bunch of optical fibres in its component cable. A branching unit may also include an optical branching component as defined in ITU-T G.671.

A second optical communication link 312 between the third network element 216 and fourth network element 218 may traverse branching units 306 and 308 in the example shown. Each optical link may also traverse other branching units or apparatus (not shown). In other embodiments, however, each branching unit 304-310 may instead merely be a geographical location through which the communication link passes.

As both communication links 302 and 312 pass through branching units 306 and 308, it may be the case that portions of the communication links between the branching units 306 and 308 are geographically co-located, e.g. are buried in the same trench as each other or are located within the same bundle of optical fibers. Therefore, the cause of damage to the portion of one link may also cause damage to the portion of the other link.

For example, if there is a fault 320 in the first communication link 302 located between branching units 304 and 306, the second communication link 312 may not be affected as the fault 320 is located along a portion of the first link 302 that is not co-located with any portion of the second link 312. Similarly, if there is a fault 322 in the second communication link 312 located between branching unit 308 and the network element 218, the first communication link 302 may not be affected as the fault 322 is located along a portion of the second link 312 that is not co-located with any portion of the first link 302. However, an event that causes damage to optical fibers located between branching units 306 and 308 may affect both communication links 302 and 312.

Embodiments of the present disclosure include sharing information between network domains to locate the cause of faults in optical links. For example, if network elements on both optical links 302 and 312 detect a fault in their respective optical link, and portions of the links are co-located, it is possible that the location of the cause of the fault is along the co-located portions (e.g. because the same event has caused damage to both optical links). Sharing information about optical links with faults between network domains, or from network domains to another network element, may enable the network domains or the other network element to infer details as to the location of the cause of the faults.

For example, if one link is associated with one or more OTDRs, then the domain containing the link may share information of the location of a fault along that link. The information can then be used to locate a fault in another optical link in another domain, particularly if the other optical link is not associated with any OTDRs and may not be able to estimate the location of a fault independently. If both optical links are equipped with OTDR they may share results of their respective OTDR measurements as these will help to more precisely determine location of the fault (or rather two faults, one on each optical link, and in the likely scenario they will be caused by the same event, e.g. damage).

In modern telecommunications networks within a single bundle of optical fibers (optical cable) there may be fibers carrying signals coming from many sources and managed by different administrative domains (i.e. different Software Defined Networking, SDN, controllers or Network Management Systems), potentially from different operators. This document discloses a solution in which a controller manages network elements like 212, 214, 216, 218, 204 and 208 to propagate information of where the fault is to the controller (MDSC) which in turn cascades the info to all the other controllers managing a signal going through that bundle of optical fibers. This is advantageous for the following reasons: OTDR devices are expensive and normally are available only for a fraction of optical fibers in the bundle, hence making the results of their measurements available to other domains, not equipped with OTDR functionality, is a clear advantage. Additionally, the more inputs from OTDR or other measurements (e.g. OFDR, optical frequency domain reflectometry) are available the more accurately the location of the fault can be determined. Even if none of the optical fibers in a bundle is equipped with OTDR or similar functionality then reporting information about detection of a fault (loss of signal) to the MDSC allows for improved estimation of the fault's location (knowing that there are multiple faults reported at the same time and knowing network topology allows for identifying a section where the affected fibers are co-located as the likely location of the fault).

Figure 4:
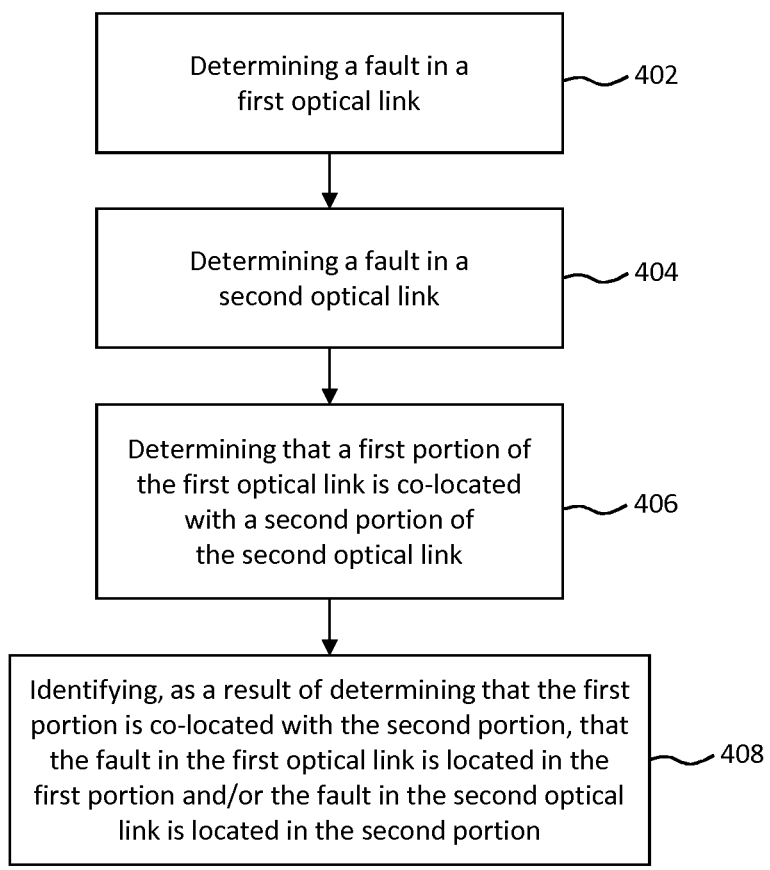
FIG. 4 is a flow chart of an example of a method of locating a fault in an optical communication link.

FIG. 4 shows a flow chart of an example of a method 400 for locating a fault in an optical communication link. The method 400 may be implemented on any suitable apparatus, but in some embodiments may be implemented on a MDSC such as MDSC 202 shown in FIG. 2. The method 400 includes the step 402 of determining a fault in the first optical link, such as for example link 302 in FIG. 3, and the step 404 of determining a fault in a second optical link, such as for example link 312 in FIG. 3.

The presence of a fault may be determined in any suitable manner. For example, a network element such as network element 212 may detect that it can no longer communicate with network element 214. For example, detecting a loss of signal may indicate a fault between network elements 212 and 214. Similarly, this may also be observed by element 214. Therefore, the element 212 and/or the element 214 may report to the PNC 204 that the communication link between the elements 212 and 214 is inoperable. Alternatively, for example, the element 212 and/or the element 214 may observe a degradation in quality of the optical link between them. An inoperable or degraded link may indicate the presence of a fault in the link such as physical damage to a fibre optic cable.

The PNC 204 may report the fault to the MDSC 202. Thus, for example, the MDSC 202 may determine the fault in the first optical link by receiving a first notification from the PNC 204 of the fault in the first optical link, wherein the first optical link and the PNC 204 are associated with a first network domain. Similarly, the MDSC 202 may determine the fault in the second optical link by receiving a second notification from PNC 208 of the fault in the second optical link, wherein the second optical link and the PNC 208 are associated with a second network domain. However, in other embodiments the entity implementing the method 400 may determine the faults in the first and second links in any suitable manner.

Step 406 of the method 400 comprises determining that a first portion of the first optical link is co-located with a second portion of the second optical link. For example, the MDSC 202 may query its records of the topology of the first and second network domains and discover that the first and second optical links, which both have a fault, include portions that are co-located (e.g. the records may indicate that both optical links include portions that pass through the same pair of branching units).

Step 408 of the method 400 comprises identifying, as a result of determining that the first portion is co-located with the second portion, that the fault in the first optical link is located in the first portion and/or the fault in the second optical link is located in the second portion. For example, the MDSC may determine that the same event (e.g. damage to a bundle of fibers or fibers located in the same trench) is affecting both the first and second links and that the fault in the respective links is located along the co-located portions. For example, for the fault 324 shown in FIG. 3, the MDSC may determine that the fault is located along the portions of the first and second links 302 and 312 between the branching units 306 and 308.

In other embodiments, the method 400 may be implemented by another entity. For example, the method 400 may be implemented by the PNC 204 or the PNC 208, or a PNC associated with any network domain. In these examples, the PNC implementing the method may determine a fault within its own domain (e.g. receiving notifications from associated network elements), and receive a notification from another PNC associated with another domain that there is a fault in the other domain. The notification may be received, for example, via the MDSC 202 over the PNC interface 206.

As such, the method 400 in some examples identifies a portion of one or both links where the fault is located, and therefore locates the fault by reducing the number of possible locations for the fault. In some examples, by taking information from multiple domains, the location of the fault can be determined more accurately than if only information from one domain is considered, as information from one domain may comprise only information from two network elements and a single optical link between them.

In some other examples, once it is determined that that the fault in the first optical link is located in the first portion and/or the fault in the second optical link is located in the second portion, the information can be shared within the network, e.g. between separate network domains operating on the same physical network infrastructure. For example, referring to FIG. 3, the MDSC 202 may determine that the same damage-causing event affects the links 302 and 312 between branching units 306 and 308. The MDSC 202 may then inform the PNC 204 and/or the PNC 208 that the fault is located along the appropriate portions of the links 302 and 312. Knowing the location or the approximate location (e.g. between two branching units) of a fault may allow PNCs to locate the fault more quickly and to discover and repair the cause of the fault. This may therefore reduce repair times.

One or more network elements may include fault locating apparatus. For example, the network element 212 shown in FIG. 3 includes fault locating apparatus 314, and network element 214 includes fault locating apparatus 316. The fault locating apparatus may provide an estimated location of a fault in an optical link. This may be done using one fault locating apparatus, however using multiple fault locating apparatus (e.g. at each end of the link 302 as shown in FIG. 3) would provide two fault location estimates and hence the fault location may be estimated more accurately by combining the estimates. In some examples, a locating apparatus comprises an optical time domain reflectometer (OTDR).

In one example, indications may be received from two fault locating apparatus in respective network elements (e.g. elements 212 and 214) of respective estimated locations of the fault. It may then be determined that the fault in the optical link (e.g. link 302) is located in a section of the optical link between the two estimated locations. Supposing that the fault is located at point 324 between the branching units 306 and 308, the two estimates may fall outside of the portion of the link 302 between the branching units 306 and 308, and therefore the section between the estimates includes the portion between the branching units 306 and 308. Alternatively, the two estimates may be within this portion, and therefore the section is included within the portion. In the former case, for example, embodiments disclosed herein may use information regarding the fault in the other optical link 312 to narrow down the location of the fault within the section to the portion between branching units 306 and 308. In the latter case, for example, the location of the fault has been determined as a section of the portion between branching units 306 and 308, and this information may be shared with the appropriate entity (e.g. PNC 208) to enable the fault on the second link 312 to be located. It is noted that in the example shown in FIG. 3, the network elements 216 and 218 do not include fault locating apparatus, and therefore may not be able to provide an estimated location of the fault. In this case, without information regarding the fault on the first optical link 302, the PNC 208 may only know that there is a fault along the entire link 312 but not the location of the fault.

In some embodiments disclosed herein, once the fault has been located, the entity implementing the method may share the information. For example, where the method is implemented by MDSC 202 or another entity, the entity may notify the first PNC 204 that the fault in the first optical link is located in the first portion (e.g. between branching units 306 and 308 shown in FIG. 3), and/or notify the second PNC 208 that the fault in the second optical link is located in the second portion. In this way, the PNCs may learn of the location or approximate location of the fault, and appropriate action may be taken. For example, action may be taken to repair the fault. Additionally or alternatively, action may be taken to route communications between network entities to alternative paths that circumvent the fault location.

Figure 5:
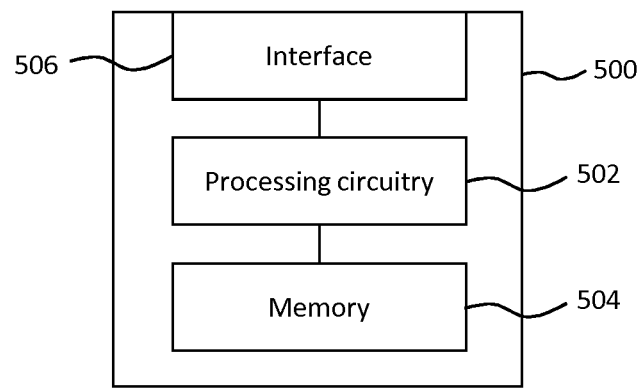
FIG. 5 is a schematic illustration of an example of an apparatus for locating a fault in an optical communication link.

FIG. 5 shows an example of apparatus 500 according to embodiments of the disclosure. The apparatus 500 may be an apparatus for locating a fault in an optical communication link. The apparatus 500 may be configured to perform the method 400 of FIG. 4.

The apparatus 500 comprises processing circuitry 502 (e.g. a processor) and a memory 504 in communication with the processing circuitry 502. The memory 504 contains instructions executable by the processor 502. The apparatus 500 also comprises an interface 506 in communication with the processing circuitry 502. Although the interface 506, processing circuitry 502 and memory 504 are shown connected in series, these may alternatively be interconnected in any other way, for example via a bus. The interface 506 also enables communication between the apparatus 500 and network elements of a communications network (e.g. network 102).

In one embodiment, the memory 504 containing instructions executable by the processor 502 such that the apparatus is operable to: determine a fault in a first optical link; determine a fault in a second optical link; determine that a first portion of the first optical link is co-located with a second portion of the second optical link; and identify, as a result of determining that the first portion is co-located with the second portion, that the fault in the first optical link is located in the first portion and/or the fault in the second optical link is located in the second portion.

In some embodiments, to determine a fault in the first optical link, the apparatus 500 is operable to receive an indication from a first fault locating apparatus at the first network element of a first estimated location of the fault. For example, the first fault locating apparatus comprises an optical time domain reflectometer (OTDR). The apparatus 500 may be the first network element, another network element, a node in the same domain as the first network element, a node in a different domain, or a node outside of any particular network domain (e.g. the MDSC 108 shown in FIG. 1).

To determine a fault in the first optical link, the apparatus 500 may be operable to receive an indication from a second fault locating apparatus at the second network element of a second estimated location of the fault, and determine that the fault in the first optical link is located in a section of the first optical link between the first and second estimated locations, wherein the section includes or is included in the first portion. In this way, the location of the fault may be determined with more accuracy than if a single fault finding apparatus is used. For example, OTDRs located at each end of an optical link at the corresponding network elements may both provide estimated locations, which can then be used to determine that the fault is located between the estimated locations from the OTDRs.

In some embodiments, to determine that the first portion is co-located with the second portion, the apparatus 500 is operable to determine that the first optical link traverses first and second branching units, and determine that the second optical link traverses the first and second branching units, wherein the first and second portions are between the first and second branching units. For example, as shown in FIG. 3, the apparatus 500 may determine that the optical links 302 and 312 both traverse branching units 306 and 308, and hence it is likely that the sections of the links between these branching units 306 and 308 are co-located.

To determine the fault in the first optical link the apparatus 500 may be operable to receive a first notification from a first physical network controller (PNC) of the fault in the first optical link, wherein the first optical link and the first PNC are associated with a first network domain. For example referring to FIG. 2, the apparatus 500 may be the MDSC 202 or the PNC 208, or another node located outside of the domain associated with PNC 204, and the first notification may be received from PNC 204. Additionally or alternatively, to determine the fault in the second optical link, the apparatus 500 may be operable to receive a second notification from a second PNC of the fault in the second optical link, wherein the second optical link and the second PNC are associated with a second network domain. For example, the apparatus 500 may be the PNC 204, the MDSC 202 or another node.

In some embodiments, the memory 504 contains instructions executable by the processor 502 such that the apparatus 500 is operable to notify the first PNC that the fault in the first optical link is located in the first portion; and/or notify the second PNC that the fault in the second optical link is located in the second portion. As such, information shared with the PNCs relating to faults in network domains other than their own domains may be used by the PNCs to locate faults within their own network domain. For example, the first PNC may receive information regarding the geographic location of a fault ion an optical link in another network domain, information regarding the branching units between which the fault is located, information identifying the link in the other network domain that is experiencing a fault, or any other information that the first PNC can use to determine that there may be a fault within its own domain and/or locate the fault with more accuracy or reliability than if it mainly used information from within its own domain.

Where the apparatus 500 is a PNC for example, to determine the fault in the first optical link, the apparatus may be operable to detect the fault in the first optical link, wherein the first optical link and the first PNC are associated with a first network domain. For example, the first PNC may receive information from a network element in its own domain that an optical link is experiencing a fault, and may also receive an approximate location of the fault (e.g. if the link experiencing a fault has an OTDR at one or both ends). Further, to determine the fault in the second optical link, the apparatus 500 may be operable to receive a notification from a second PNC of the fault in the second optical link, wherein the second optical link and the second PNC are associated with a second network domain. The first PNC may then combine information from the detection of the fault in its own domain and the notification from the second PNC to determine the location of the fault. In some examples, the memory 504 may also contain instructions executable by the processor 502 such that the apparatus 500 is operable to notify the second PNC that the fault in the second optical link is located in the second portion. As a result, the second PNC may also be able to determine the location of the fault in the second optical link with more accuracy.

Figure 6:
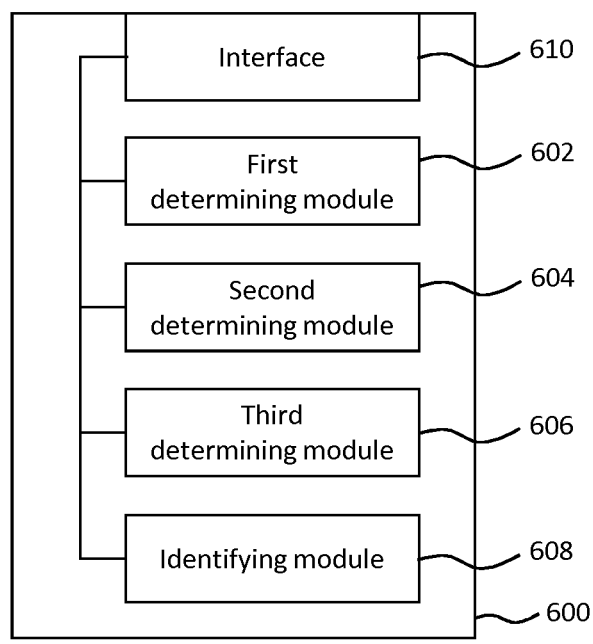
FIG. 6 is a schematic illustration of another example of an apparatus for locating a fault in an optical communication link.

FIG. 6 shows an example of an apparatus 600 for locating a fault in an optical communication link. The apparatus 600 comprises a first determining module 602 configured to determine a fault in a first optical link, and a second determining module 604 configured to determine a fault in a second optical link. The apparatus 600 also comprises a third determining module 606 configured to determine that a first portion of the first optical link is co-located with a second portion of the second optical link, and an identifying module 608 configured to identify, as a result of determining that the first portion is co-located with the second portion, that the fault in the first optical link is located in the first portion and/or the fault in the second optical link is located in the second portion. The apparatus 600 may also comprise an interface 610 in communication with one or more of the other modules 602-608. The interface 610 also enables communication between the apparatus 600 and network elements of a communications network (e.g. network 102). Although the elements 602-610 of the apparatus 600 are shown connected to a bus, these may alternatively be interconnected in any other way, for example in series.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of locating a fault in an optical communication link, comprising:
   receiving a notification of a fault in a first optical link;
   receiving a notification of a fault in a second optical link, wherein the first optical link belongs to a first network domain and the second optical link belongs to a second network domain;
   determining, in response to the notifications, that a first portion of the first optical link is co-located with a second portion of the second optical link; and
   identifying, as a result of determining that the first portion is co-located with the second portion, that the fault in the first optical link is located in the first portion and/or the fault in the second optical link is located in the second portion.

2. The method of claim 1, wherein the first optical link comprises a fibre optic connection between first and second network elements, and the second optical link comprises a fibre optic connection between third and fourth network elements.

3. The method of claim 2, wherein:
   receiving the notification of the fault in the first optical link comprises receiving an indication from a first fault locating apparatus at the first network element of a first estimated location of the fault.

4. The method of claim 3, wherein receiving the notification of the fault in the first optical link further comprises:
   receiving an indication from a second fault locating apparatus at the second network element of a second estimated location of the fault; and
   determining that the fault in the first optical link is located in a section of the first optical link between the first and second estimated locations, wherein the section includes or is included in the first portion.

5. The method of claim 4, wherein the second fault locating apparatus comprises an optical time domain reflectometer.

6. The method of claim 1, wherein determining that the first portion is co-located with the second portion comprises determining that the first optical link traverses first and second branching units, and determining that the second optical link traverses the first and second branching units.

7. The method of claim 6, wherein the first and second branching units each comprise a switch, router, fibre optic patch panel or fibre optic enclosure.

8. The method of claim 1, wherein:
   receiving the notification of the fault in the first optical link comprises receiving a first notification from a first physical network controller (PNC) of the fault in the first optical link, wherein the first optical link and the first PNC are associated with a first network domain; and
   receiving the notification of the fault in the second optical link comprises receiving a second notification from a second PNC of the fault in the second optical link, wherein the second optical link and the second PNC are associated with a second network domain.

9. The method of claim 1, wherein:
   the method is implemented by a first physical network controller (PNC);
   receiving the notification of the fault in the first optical link comprises receiving a notification of a fault detected by an associated network element operating on the first optical link, wherein the first optical link and the first PNC are associated with a first network domain; and
   receiving the notification of the fault in the second optical link comprises receiving a notification from a second PNC of the fault in the second optical link, wherein the second optical link and the second PNC are associated with the second network domain.

10. The method of claim 1, comprising receiving information about an estimated location of at least one of the faults.

11. A non-transitory computer readable medium having stored thereon a computer program comprising instructions that, when executed on at least one processor, cause the at least one processor to carry out a method of locating a fault in an optical communication link, the method comprising:
    receiving a notification of a fault in a first optical link;
    receiving a notification of a fault in a second optical link, wherein the first optical link belongs to a first network domain and the second optical link belongs to a second network domain;
    determining, in response to the notifications that a first portion of the first optical link is co-located with a second portion of the second optical link; and
    identifying, as a result of determining that the first portion is co-located with the second portion, that the fault in the first optical link is located in the first portion and/or the fault in the second optical link is located in the second portion.

12. An apparatus for locating a fault in an optical communication link, the apparatus comprising a processor and a memory, the memory containing instructions executable by the processor such that the apparatus is operable to:
    receive a notification of a fault in a first optical link;
    receive a notification of a fault in a second optical link, wherein the first optical link belongs to a first network domain and the second optical link belongs to a second network domain;
    determine, in response to the notifications, that a first portion of the first optical link is co-located with a second portion of the second optical link; and
    identify, as a result of determining that the first portion is co-located with the second portion, that the fault in the first optical link is located in the first portion and/or the fault in the second optical link is located in the second portion.

13. The apparatus of claim 12, wherein the first optical link comprises an optical link between first and second network elements, and the second optical link comprises an optical link between third and fourth network elements.

14. The apparatus of claim 13, wherein to receive a notification of the fault in the first optical link the apparatus is operable to receive an indication from a first fault locating apparatus at the first network element of a first estimated location of the fault.

15. The apparatus of claim 14, wherein the first fault locating apparatus comprises an optical time domain reflectometer.

16. The apparatus of claim 14, wherein to receive a notification of the fault in the first optical link the apparatus is operable to:

receive an indication from a second fault locating apparatus at the second network element of a second estimated location of the fault; and determine that the fault in the first optical link is located in a section of the first optical link between the first and second estimated locations, wherein the section includes or is included in the first portion.

17. The apparatus of claim 16, wherein the second fault locating apparatus comprises an optical time domain reflectometer.

18. The apparatus of claim 12, wherein to determine that the first portion is co-located with the second portion the apparatus is operable to determine that the first optical link traverses first and second branching units, and determine that the second optical link traverses the first and second branching units.

19. The apparatus of claim 18, wherein the first and second branching units each comprise a switch, router, fibre optic patch panel or fibre optic enclosure.

20. The apparatus of claim 12, wherein the apparatus comprises a multi domain service coordinator.

21. The apparatus of claim 12, wherein the apparatus comprises a first physical network controller.

22. The apparatus of claim 12, operable to receive information about an estimated location of at least one of the faults.

* * * * *